United States Patent [19]

Sims, Jr. et al.

[11] Patent Number: 4,915,354

[45] Date of Patent: Apr. 10, 1990

[54] CUSHIONED VALVE SEAT

[75] Inventors: Dewey M. Sims, Jr., Wayne; Lawrence McAuliffe, Jr., Southfield, both of Mich.

[73] Assignee: Colt Industries Inc., New York, N.Y.

[21] Appl. No.: 335,796

[22] Filed: Apr. 10, 1989

[51] Int. Cl.⁴ .......................... F16K 1/14; F16K 1/42
[52] U.S. Cl. ...................................... 251/334; 251/364
[58] Field of Search ................ 251/334, 902, 333, 364

[56] References Cited

U.S. PATENT DOCUMENTS 2,946,552  7/1960  Mancusi .......................... 251/334 X
4,227,547  10/1980  Cameron ......................... 251/364 X Primary Examiner—Alan Cohan
Attorney, Agent, or Firm—Howard S. Reiter

[57] ABSTRACT

A valve employed in applications where the valve is rapidly cyclically opened and closed over extended periods of time is constructed in a manner such that the impact between a rapidly moving metal valve head and metal valve seat at valve closure is minimized to reduce noise and wear. The valve head engaging element of the valve seat may take the form of a frusto conical belleville washer located with its concave side resting on a flat planar wall surface in the valve housing or a flat washer bridging a frusto conical wall surface in the housing. Fluid filling the recess between the opposed surfaces of the washer and housing wall is expressed from the recess as the frusto conical washer is axially compressed against the wall by the closing valve head to further cushion or damp the resiliently resisted compression of the washer.

7 Claims, 1 Drawing Sheet

CUSHIONED VALVE SEAT

BACKGROUND OF THE INVENTION

1. Field of the Invention

Recent developments in computer controlled automotive transmission systems and suspension systems regulate hydraulic pressure or flow rate within the system by energizing and deenergizing the solenoid of a solenoid actuated valve cyclically in response to a pulse width modulated control signal generated within the computer in response to various monitored operating conditions.

The generated control signal is typically a pulsating signal at frequencies of the order of 1 to 60 Hz, and within each cycle the solenoid is energized for a portion of the cycle and deenergized during the remainder of the cycle. By varying, under the control of the computer, the portion of time within each cycle during which the solenoid is energized, over a give time interval the percentage of time during which the valve is open is similarly varied.

In a controlled suspension system, the percentage of time during which the valve is fully open over a given time interval as compared to the time within that interval during which the valve is closed provides an effective opening or restriction in a flow path which is a corresponding percentage of the opening presented by the valve when fully opened. To regulate the pressure applied to a fluid pressure actuated clutch in a transmission system, the clutch is connected to a source of fluid under pressure when the valve is in one position and connected to a fluid sump at zero pressure when the valve is in the other position. In this arrangement, the pressure applied to the clutch will be that percentage of time the clutch is connected to the fluid pressure source multiplied by the pressure of the source.

Both types of systems require that a valve head be driven into engagement with a valve seat rapidly and firmly and, for a 60 Hz pulse width modulated control signal, at the rate of 60 engagements or closures per second for period of continuous operation of substantial time duration. This requirement, as a practical matter, dictates the employment of metal valve heads and seats to stand up under the wear. The employment of metal heads and seats in turn produces a problem in that a certain amount of noise is generated by each impact of a rapidly moving metal valve head with a stationary metal valve seat. Also, in the automotive industry, where parts are customarily purchases in large numbers, the unit price per part is of substantial concern.

The present invention is especially directed to an inexpensive and practical solution to the problems of minimizing both wear and operational noise in valves of the type discussed above.

SUMMARY OF THE INVENTION

In accordance with the present invention, a valve housing is formed with an internal chamber having a flat planar wall through which a flap passage opens into the chamber. A frusto conical belleville washer is located on this wall in concentric relationship with the flow passage opening with the concave side of the washer engaged around its periphery with the wall surface. The frusto conical shape of the washer forms a fluid receiving recess between the opposed surfaces of the washer and wall, this recess being in fluid communication around its inner periphery with the flow passage.

A valve head is mounted within the chamber for movement axially of the washer into and out of engagement with the exposed or convex side of the belleville washer. The washer may be resiliently deformed - axially compressed -by the valve head into a flat, generally planar configuration in which the wall and opposed surface of the washer are in face-to-face engagement with each other. The resilience of the washer is selected to be such that the force of the solenoid or valve head actuator which drives the valve head into engagement with the washer is sufficient to compress the belleville washer from its normal frusto conical configuration to a nearly flat planar configuration established by the face-to-face engagement between the wall and opposed surface of the washer.

In addition to the spring-like resistance of the washer to the moving valve head to absorb a portion of the force of impact, fluid in the annular recess between the frusto conical washer and the wall surface is squeezed as the washer is axially compressed and expelled from the recess back into the flow passage as the washer is progressively compressed. This action exerts a damping force resisting compression of the washer which increases as the washer is progressively compressed toward the wall.

The cushioning of the seating of the valve head upon the valve seat constituted by the belleville washer minimizes both wear on the engaging head and seat by absorbing the initial impact of the head upon the seat and also minimizes the noise generated by this impact.

As an alternative to the belleville washer, a flat washer may be located to bridge a frusto conical valve seat.

Other objects and features of the invention will become apparent by reference to the following specification and to the drawings.

DESCRIPTION OF THE PREFERRED EMBODIMENTS

Figure 1:
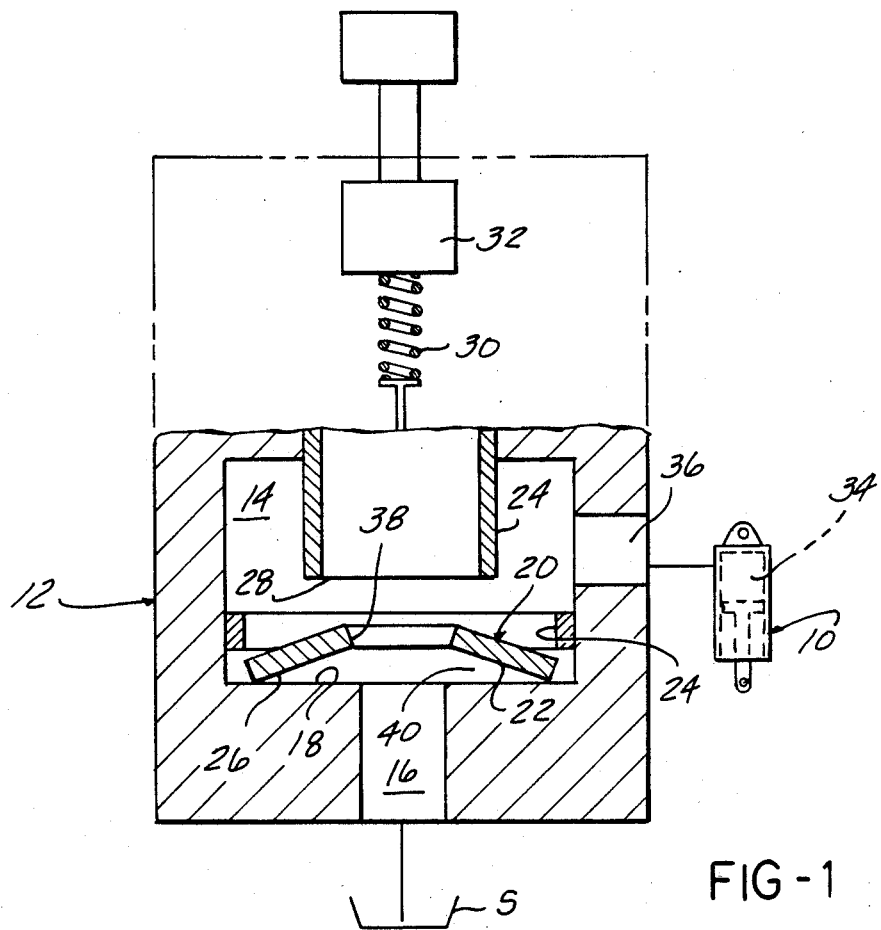
FIG. 1 is a simplified, partially schematic view showing in cross section a valve head and seat embodying the present invention employed in a schematically illustrated, computer controlled automotive suspension application.

In FIG. 1 there is schematically shown an exemplary portion of a computer controlled automotive suspension system employing one form of valve embodying the present invention to provide variable damping of an automotive shock absorber designated generally 10. Structural details of that portion of the valve embodying the present invention are shown in simplified cross-sectional form in FIG. 1, the remainder of the valve being only schematically illustrated.

The form of valve shown in FIG. 1 may be assumed to be a valve such as that shown and described in a commonly owned co-pending Application Serial No. 237,706 filed 8/29/88.

As shown in FIG. 1, the valve includes a housing designated generally 12 formed with an internal chamber 14 having a flow passage 16 opening into the chamber through a flat planar wall 18 constituting one end of the chamber. A frusto conical washer designated generally 20, commonly referred to as a belleville washer, is located on shoulder 18 in coaxial relationship with passage 16 with the concave side 22 of the washer facing surface 18. Washer 20 is loosely retained in position as by a retainer ring 21.

Figure 2:
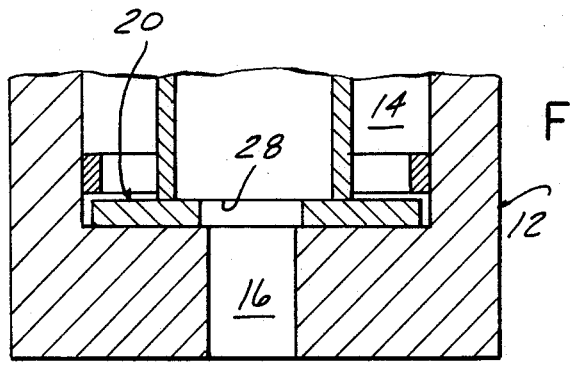
FIG. 2 is a cross-sectional view showing the valve of FIG. 1 in a closed position.

In FIG. 1, washer 20 is shown in its normal frusto conical configuration. The characteristics of the washer are such that it may be axially compressed from the configuration shown in FIG. 1 to a substantially flat planar configuration as shown in FIG. 2, the washer resiliently resisting such compression and returning to its normal, relaxed frusto conical configuration upon removal of the compressive force. Such washers are employed in some applications as a spring.

An elongate, hollow, tubular valve member 24, partially shown in FIG. 1, is mounted within housing 12 for sliding movement axially into and out of engagement with the upper or convex surface 26 of washer 20. The annular lower edge 28 of valve member 24 functions as a valve head.

In the particular valve shown, valve member 24 is normally biased downwardly to the closed position shown in FIG. 2 as by a compression spring 30. A solenoid coil schematically indicated at 32 is operatively associated with valve member 24 to retract valve member 24 upwardly to the position shown in FIG. 1 when the coil of the solenoid is electrically energized. Further details of the construction and operation of the valve shown in FIG. 1 may be had by reference to the aforementioned Application Serial No. 237,706.

In FIG. 1, the valve is shown as being employed in a computer controlled automotive suspension system. The head end chamber 34 of a shock absorber 10 is connected directly to chamber 14 via a port 36 in valve housing 12, while passage 16 is connected to a fluid sump S maintained at normal atmospheric pressure. With valve member 24 retracted clear of belleville washer 20 as shown in FIG. 1, a valve-open condition exists so that, upon compression of shock absorber 10, fluid will be expelled from the head end chamber 34 of the shock absorber into chamber 14 via port 36 and pass from chamber 14 through the central opening 38 in washer 20 and thence through passage 16 to the sump. The rate at which fluid can flow from chamber 34 to sump S under these conditions is determined by the effective restriction to such flow imposed by the valve. When the valve is fully open, a minimum restriction to such flow is imposed. If, however, the valve is in the closed position shown in FIG. 2, fluid communication between inlet port 36 and passage 16 is blocked by the closed valve, and no fluid can flow from chamber 34 of the shock absorber.

When the valve is open as in FIG. 1, it presents a minimum restriction to flow of fluid from chamber 34 upon compression of the shock absorber and the shock absorber is said to be "soft", giving the vehicle in which it is mounted a cushioned or floating-type ride. When the valve is closed, as shown in FIG. 2, it presents a maximum restriction to flow of fluid from chamber 34, and the shock absorber is said to be in a "firm" or "stiff" condition which gives the vehicle a bumpy or hard ride, but enhances the handling of the vehicle, as by minimizing sway of the vehicle on sharp turns, etc.

By rapidly cyclically energizing and deenergizing solenoid 32, an effective restriction to flow of fluid from chamber 34 to the sump may be presented by the valve, and this effective restriction may be varied to effective restrictions intermediate the extreme minimum and maximum restriction presented respectively by the valve open or valve closed condition under the control of a computer which energizes and deenergizes solenoid 32 by a pulse width modulated signal. This system is described in greater detail in the aforementioned Application Serial No. 272,706. For present purposes, valve member 24 is cyclically driven to and from its closed position at cyclic frequencies of the order of 60 Hz. This rapid and repeated shifting of valve member 24 between its open and closed positions would generate a substantial amount of wear and noise if, in seating, the valve member were driven directly into contact with a stationary valve seat. However, the employment of the resiliently compressible belleville washer 20 cushions this impact in two ways.

First, the resilience of the washer absorbs a substantial portion of the impact of valve head 28 as valve member 24 is driven to its closed position.

Secondly, in normal circumstances the recess 40 between the concave side of washer 20 and wall surface 18 will be filled with fluid when the washer is in the relaxed, valve open position of FIG. 1. As valve member 24 moves downwardly to engage and axially compress washer 20, the flattening of the washer expressed fluid from recess 40 into passage 16 and central opening 38 through an opening which progressively decreases as the washer 20 is compressed. This provides an additional damping or cushioning action which further absorbs the impact and resultant noise of the valve closure.

Such flattening deformation of the washer can occur due to valve inertia during dynamic closing, but it does not necessarily occur under static conditions. Since a solenoid that generates 1 to 2 pounds of force may have impact forces on the order of 300 pounds, the purpose of the invention is to dissipate as much of the impact energy as possible through expulsion of the fluid from under the washer.

Figure 3:
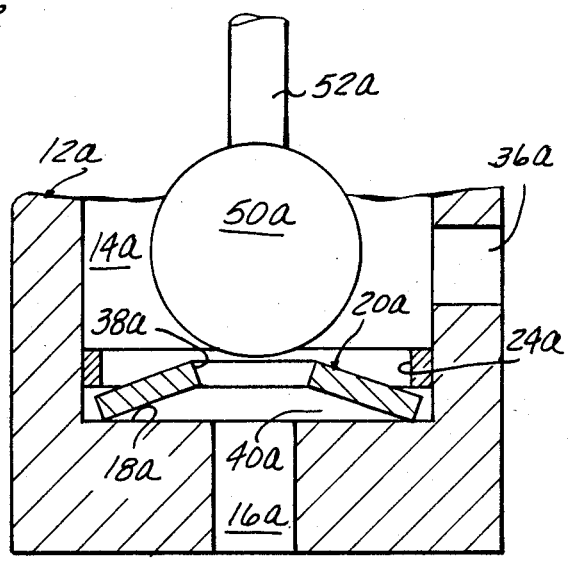
FIG. 3 is a partial cross-sectional view of a second embodiment of a valve according to the present invention.

The employment of a belleville washer as a valve seat is not restricted to the specific arrangement shown in FIG. 1. One form of modified arrangement is shown in FIG. 3 in which a valve housing 12a is formed with a chamber 14a having a planar end wall 18a through which a passage 16a opens into the chamber. As in the embodiment of FIG. 1, a belleville washer 20a is located upon wall 18a by a retaining ring 21a. In the valve of FIG. 3, the valve head consists of a metal ball 50 adapted to seat within the central opening 38a in washer 20a. In the FIG. 3 arrangement, passage 16a might, for example, be connected to a source of fluid pressure which would normally maintain ball 50a unseated from washer 20a to permit a flow of fluid form passage 16a to port 36a. A solenoid actuated push rod partially indicated at 52a would be coupled to the armature of a solenoid to drive ball 50 a downwardly upon energization of the solenoid to seat and block passage 38a while axially compressing belleville washer 20a against the resilience of the washer and fluid in recess 40a as in the previous case.

Figure 4:
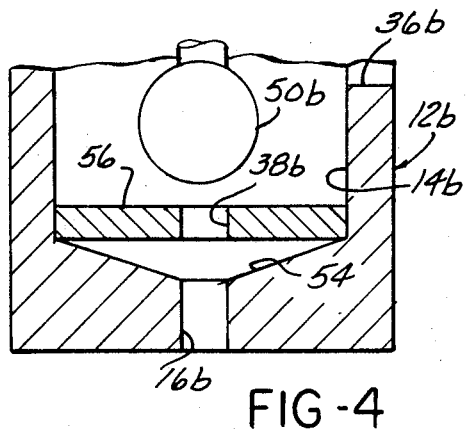
FIG. 4 is a partial cross-sectional view of a third embodiment of the invention.

Still another alternative arrangement is shown in FIG. 4. In the embodiment of FIG. 4, the lower end of chamber 14b in housing 12b is formed with a frusto conical valve seat 54 opening at its lower end into passage 16b. A flat washer 56 bridges the upper end of seat 54 between the seat 54 and a spherical valve head 50b adapted to seat in opening 38b in washer 56. As in the embodiment of FIG. 3, valve head 50b is driven downwardly to flex the washer 56 toward valve seat 54 upon closure of the valve to provide a cushioned valve seating as in the previously described embodiments.

While exemplary forms of the invention have been described, it will be apparent to those skilled in the art the disclosed embodiments may be modified. Therefore, the foregoing description is to be considered exemplary rather than limiting, and the true scope of the invention is that defined in the following claims.

What is claimed is:

1. In a valve including a valve housing, means in said housing defining a chamber and a fluid flow passage entering said chamber through an inlet opening in a planar wall of said chamber, annular valve seat means in said chamber disposed around the periphery of said inlet opening, a valve member in said chamber movable into and out of engagement with said valve seat means to respectively block or permit flow of fluid between said passage and said chamber, and valve actuating means operable to drive said valve member into engagement with said valve seat means;

the improvement wherein said valve seat means comprises an annular washer having an outer periphery, opposite side surfaces and a central opening therethrough, said washer being resiliently deformable from a normally maintained frusto conical configuration into a substantially flat planar configuration, locating means locating said washer in said chamber with one of said side surfaces of said washer engaged at its outer periphery with said planar wall of said chamber in concentric relationship with said inlet opening, said washer when so engaged defining, when in its normal configuration, an annular fluid receiving recess between said one of said side surfaces and said wall in fluid communication with said inlet opening, and head means on said valve member engageable with the other side surface of said washer to block fluid communication between said central opening and said chamber, said valve actuating means being operable to drive said valve member into engagement with said other side surface with a force sufficient to deform said washer into said substantially flat configuration against said wall while expelling fluid from said recess into said flow passage.

2. The invention defined in claim 1 wherein said locating means comprises retaining means in said chamber for loosely retaining said washer against said wall while accommodating axial compression and expansion of said washer between said frusto conical and substantially flat planar configurations.

3. The invention defined in claim 1 wherein said head means comprises a flat annular surface on said valve member lying in a general plane normal to the axis of said washer, engageable with an annular portion of said other side surface of said washer.

4. The invention defined in claim 1 wherein said head means comprises a spherical surface on said valve member coaxially aligned with and of a diameter greater than said central opening in said washer.

5. In a valve having a flow passage including coaxial large and small diameter portions and an annular wall surface at the juncture of said portion, and valve head means mounted in said large diameter portion of said passage for movement axially of said passage toward and away from said annular wall surface between respective closed and open positions, said valve head means being of a diameter greater than that of the small diameter portion of said passage, the improvement comprising an annular washer coaxially mounted in said large diameter portion of said passage between said head means and said wall surface, said washer having a central opening therein of a diameter less than that of said valve head means and having an outer peripheral edge sealingly engaged with said wall surface to support said opening in axially spaced relationship to said wall surface whereby said central opening in said washer establishes fluid communication between said large and small diameter portions of said passage, said washer and said wall surface having facing opposed surfaces defining a frusto conical fluid containing recess therebetween when said washer is in its normal configuration, said valve head means being operable upon movement from said open to said closed positions to successively close said central opening and deform said washer from its normal configuration into substantial face to face contact with said wall surface by forcibly expelling fluid from said recess into said small diameter portion of said passage.

6. The invention defined in claim 5 wherein said wall surface lies in a general plane extending radially of the axis of said passage, and said washer is of a frusto conical normal configuration and disposed with its concave side facing said wall surface.

7. The invention defined in claim 5 wherein said wall surface is of a concave frusto configuration and said washer is substantially flat when in its normal configuration.

* * * * *